US011762699B2

(12) United States Patent
Manchale Sridhar et al.

(10) Patent No.: US 11,762,699 B2
(45) Date of Patent: *Sep. 19, 2023

(54) ASSIGNMENT OF RESOURCES TO DATABASE CONNECTION PROCESSES BASED ON APPLICATION INFORMATION

(71) Applicant: salesforce.com, inc., San Francisco, CA (US)

(72) Inventors: Akshay Manchale Sridhar, San Francisco, CA (US); Gary J. Baker, Zephyr Cove, NV (US)

(73) Assignee: Salesforce, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/388,571

(22) Filed: Jul. 29, 2021

(65) Prior Publication Data
US 2021/0357264 A1    Nov. 18, 2021

Related U.S. Application Data

(63) Continuation of application No. 16/395,851, filed on Apr. 26, 2019, now Pat. No. 11,106,503.

(51) Int. Cl.
*G06F 9/50* (2006.01)
*G06N 20/00* (2019.01)
*G06F 16/21* (2019.01)

(52) U.S. Cl.
CPC .......... *G06F 9/5027* (2013.01); *G06F 16/217* (2019.01); *G06N 20/00* (2019.01)

(58) Field of Classification Search
CPC ...... G06F 9/5027; G06F 16/217; G06N 20/00
See application file for complete search history.

(56) References Cited

U.S. PATENT DOCUMENTS 7,020,878 B1    3/2006  Rhee et al.
7,209,929 B2    4/2007  Dominguez, Jr. et al.
(Continued)

OTHER PUBLICATIONS

Koutoupis, "Everything You Need to Know about Linux Containers, Part I: Linux Control Groups and Process Isolation", Aug. 21, 2018. Found on the web: https://www.linuxjournal.com/content/everything-you-need-know-about-linux-containers-part-i-linux-control-groups-and-process (Year: 2018); 15 pages.

*Primary Examiner* — Wissam Rashid
(74) *Attorney, Agent, or Firm* — Kowert, Hood, Munyon, Rankin & Goetzel, P.C.; Catherine L. Gerhardt; Dean M. Munyon (57) ABSTRACT

Techniques are disclosed relating to using different process groups to control allocation of execution resources for database connection processes that handle application requests. In disclosed embodiments, a database server receives a request from an application server for database resources, including application information specifying one or more attributes of the request. The server may assign a database connection process to access a database for the request and assign the database connection process to a process group based on the application information. The server may assign execution resources based on resource allocation parameters that are associated with the assigned process group. In disclosed embodiments, tenants that are using inappropriate amounts of resources are identified and requests from the identified tenants may be assigned to process groups whose processes are allocated a smaller amounts of resources per process than other process groups, which may reduce performance degradation in a database system.

20 Claims, 6 Drawing Sheets

(56) References Cited

U.S. PATENT DOCUMENTS

| | | |
|---|---|---|
| 8,595,181 B2 | 11/2013 | Le Stum |
| 10,191,768 B2 | 1/2019 | Bishop et al. |
| 10,877,786 B1 | 12/2020 | Dunagan et al. |
| 2008/0228923 A1 | 9/2008 | Chidambaran et al. |
| 2011/0153581 A1* | 6/2011 | Kass .................. G06F 16/256 707/705 |
| 2012/0331016 A1 | 12/2012 | Janson et al. |
| 2019/0205173 A1 | 7/2019 | Gupta et al. |

* cited by examiner

ASSIGNMENT OF RESOURCES TO DATABASE CONNECTION PROCESSES BASED ON APPLICATION INFORMATION

The present application is a continuation of U.S. application Ser. No. 16/395,851, filed Apr. 26, 2019, which is incorporated by reference herein in its entirety.

BACKGROUND

Technical Field

Embodiments described herein relate to database systems and, in particular, to controlling allocation of execution resources for database connection processes.

Description of the Related Art

Database servers typically handle various requests to access a database from one or more application servers. Database servers may maintain a pool of database connection processes that may share system resources. Databases are often overwhelmed or experience performance degradation during times of heavy activity, e.g., due to lack of client integration or, in the multi-tenant database context, due to rogue tenants using inappropriate amounts of system resources for application requests.

This disclosure includes references to "one embodiment," "a particular embodiment," "some embodiments," "various embodiments," "an embodiment," etc. The appearances of these phrases do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation— [entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. For example, a "database server configured to assign database connection processes for accessing one or more databases" is intended to cover, for example, equipment that has a program code or circuitry that performs this function during operation, even if the circuitry in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

It is to be understood that the present disclosure is not limited to particular devices or methods, which may, of course, vary. It is also to be understood that the terminology used herein is for the purpose of describing particular embodiments only, and is not intended to be limiting. As used herein, the singular forms "a", "an", and "the" include singular and plural referents unless the context clearly dictates otherwise. Furthermore, the words "can" and "may" are used throughout this application in a permissive sense (i.e., having the potential to, being able to), not in a mandatory sense (i.e., must). The term "include," "comprise," and derivations thereof, mean "including, but not limited to." The term "coupled" means directly or indirectly connected.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. When used in the claims, the term "or" is used as an inclusive or and not as an exclusive or. For example, the phrase "at least one of x, y, or z" means any one of x, y, and z, as well as any combination thereof (e.g., x and y, but not z).

DETAILED DESCRIPTION

In disclosed embodiments, a database server interacts with a database to process one or more application requests from an application server. In some embodiments, application requests include application information that allows the database server to intelligently assign system resources to database connection processes that handle the requests. This may reduce or avoid scenarios where less important requests overwhelm the database.

In some embodiments, the database server assigns database connection processes to process groups (e.g., Linux control groups) that have different allocation parameters for execution resources. In some embodiments, the database server assigns processes to process groups based on the application information received from an application server. For example, the application information may specify a tenant associated with the request, functionality associated with the request, whether the request is for a foreground or background task, etc., and the database server may use this information to assign a database connection process for the task to a process group. Different process groups may have different amounts of CPU resources per process, for example.

Overview of System for Controlling Resources

Figure 1:
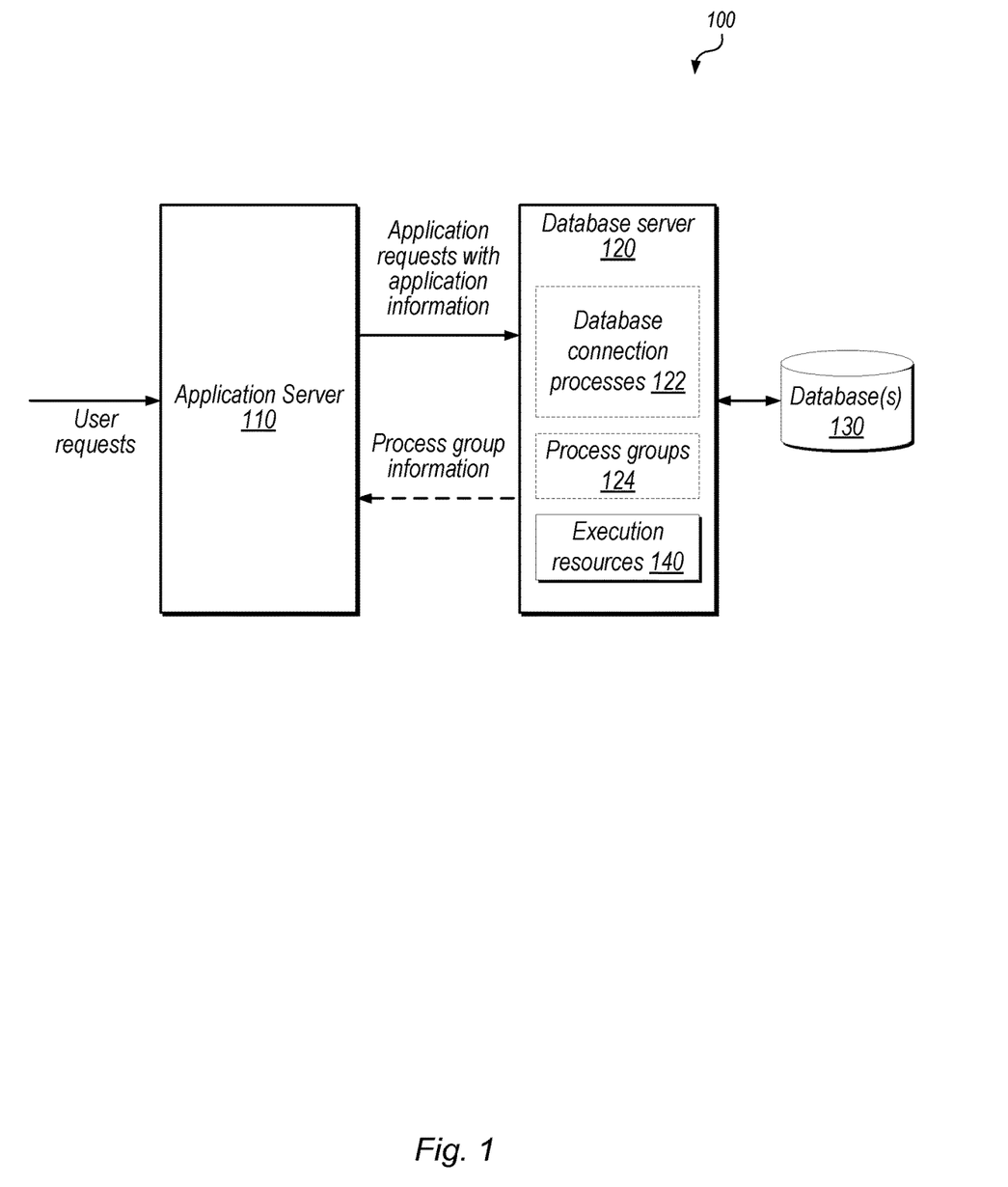
FIG. 1 is a block diagram illustrating an example system for processing one or more application requests using different amounts of execution resources, according to some embodiments.

FIG. 1 is a block diagram illustrating an example system for processing one or more application requests using different amounts of execution resources, according to some embodiments. In the illustrated embodiment, system 100 includes application server 110 and database server 120 that communicate to process one or more user requests from the application server 110. In some embodiments, system 100 is a multi-tenant database system configured to handle requests for various different tenants. Database server 120 utilizes various execution resources 140 when accessing database(s) 130 to process one or more application requests received, along with corresponding application information, from application server 110. Database server 120, in the illustrated embodiment, maintains database connection processes 122 and a plurality of process groups 124.

Application server 110 may receive requests from various user or non-user entities. In the illustrated example, application server 110 sends one or more application requests, along with application information associated with specific requests, to database server 120. In some embodiments, multiple different application servers may communicate with database server 120 at the same time or at different times.

In some embodiments, the application information from application server 110 specifies one or more attributes of the corresponding application request. The one or more attributes of a request may indicate one or more of the following: a tenant initiating the request in a multi-tenant system, a user group of a user initiating the request, application functionality associated with the request, a user initiating the request, etc. Application "functionality" may indicate the type of application, a feature or subset of the application (e.g., a calendar portion or a task tracking portion of a larger customer-relationship management application), a specific function or operation for which the request is performed, etc.

Database server 120, in the illustrated embodiment, assigns a database connection process 122 for each application request received from application server 110 to access one or more databases 130 for the request. As used herein, the phrase "database connection process" is intended to be construed according to its well-understood meaning, which includes an instance of a computer program (e.g., its program instructions and state) that is executable by a database server to access a database. A database connection process may be an operating system process, for example. Database connection processes are often referred to as "backend" processes. For example, a database connection process may be a PostgreSQL backend process for a client running on a database server.

In some embodiments, database server 120 assigns a given process to a process group 124 based on application information from application server 110 that indicates one or more attributes of a given application request. Database server 120 may consider various parameters (e.g., available execution resources) of different process groups when assigning a process to a process group. In some embodiments, database connection processes 122 provide access to multiple different databases.

As used herein, "process group" refers to a set of processes for which a data structure maintains parameters that affect assignment of execution resources to the set of processes. For example, process groups may be one or more Linux control groups or any of various other structures for managing resource allocation. In these embodiments, the allocation of execution resources to process groups may be performed by one or more subsystem modules (discussed in detail below), based on resource allocation parameters for the process groups.

In some embodiments, existing database connection processes may be maintained in a pool. For example, a database connection process may not be executing, but the database server 120 may maintain its instructions and state while it remains in the pool. This may, for example, remove the need to create and destroy a database connection process each time an application request is processed. In some embodiments, this may decrease processing time for application requests.

Speaking generally, control module(s) configured to assign database connection processes to process groups may be located on database server 120, application server 110, or both. In embodiments in which application server 110 implements such control functionality, database server 120 sends process group information to application server 110. For example, this information may indicate a set of process groups used by database server 120, resource allocation parameters associated with the process groups, etc. Application server 110 may send instructions to database server 120 (e.g., in the application information) specifying in which of process groups 124 the one or more database connection processes should be placed.

In other embodiments, application server 110 does not receive process group information from database server 120, but sends application information without knowledge of process groups implemented by database server 120. In these embodiments, one or more modules on database server 120 may assign processes to process groups based on the application information, without further input from application server 110.

Database server 120, in the illustrated embodiment, assigns execution resources 140 to the database connection process based on the resource allocation parameters for the process group 124 to which the database connection process is assigned. In some embodiments, database server 120 executes the database connection processes using the execution resources 140 assigned to their process group 124.

Execution resources may include various hardware or software resources used to execute processes. Examples of execution resources include, without limitation: processor hardware, devices, memory space, input/output interfaces, network resources (such as priority, ports, or connections), etc. Execution resource parameters may indicate amounts of resources, priority for using resources, time restrictions on when resources are allowed to be used, etc.

As used herein, the term "multi-tenant database system" refers to those systems in which various elements of hardware and software of the database system are shared by one or more customers. For example, a given application server may simultaneously process requests for a great number of customers, and a given database table may store rows for a potentially greater number of customers. In various embodiments, data for different tenants may be securely stored such that other tenants cannot access the data, ab sent permission.

Example Task-Specific Control Groups

Figure 2:
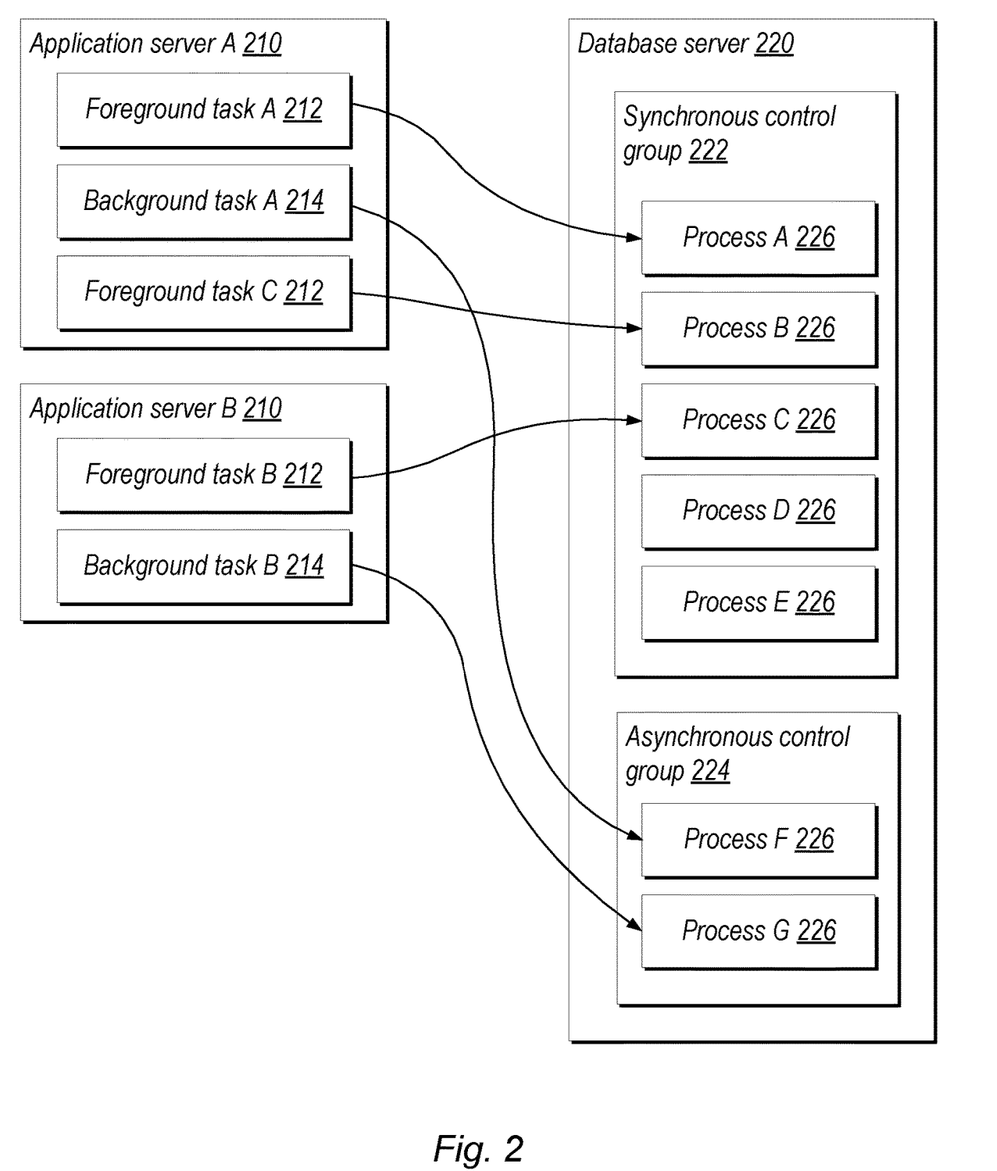
FIG. 2 is a diagram illustrating different control groups for processing foreground tasks and background tasks, according to some embodiments.

FIG. 2 is a block diagram illustrating example synchronous and asynchronous process groups for processing various foreground and background tasks, according to some embodiments. In the illustrated embodiment, application servers A and B 210 send requests for various foreground tasks 212 and background tasks 214 to database server 220, which assigns the tasks to control groups 222 and 224 for processing.

Speaking generally, foreground tasks have more real-time requirements than background tasks and may, for example, have a displayed deliverable or expected response. In contrast, response time for background tasks may be less important to user experience. Foreground tasks may generally be higher-priority than background tasks. In the illustrated embodiment, foreground tasks are assigned to the synchronous control group (which may have relatively more execution resources) and background tasks are assigned to the asynchronous control group. In some embodiments, the application information from an application server indicates whether a task is a foreground or background task. In other embodiments, the application server 210 assigns tasks to control groups, e.g., by indicating whether a given task should be assigned to the synchronous control group or the asynchronous control group.

In some embodiments, database server 220 assigns one or more database connection processes to one or more other control groups that are not shown. In some embodiments, synchronous control group 222 is configured using different resource allocation parameters such that its database connection processes are prioritized over the database connection processes in the asynchronous group 224. In some embodiments, the different resource allocation parameters associated with the control groups are used by one or more schedulers to control execution resources allocated to each control group.

In disclosed techniques, various different control groups may be created or modified by an application server, database server, or both. For example, one or both of an application server and database server may modify the types or amounts of execution resources available to an existing control group. As another example, one or both of an application server and a database server may generate one or more control groups to handle processes for one or more requests.

Example Resource Allocation

Figure 3:
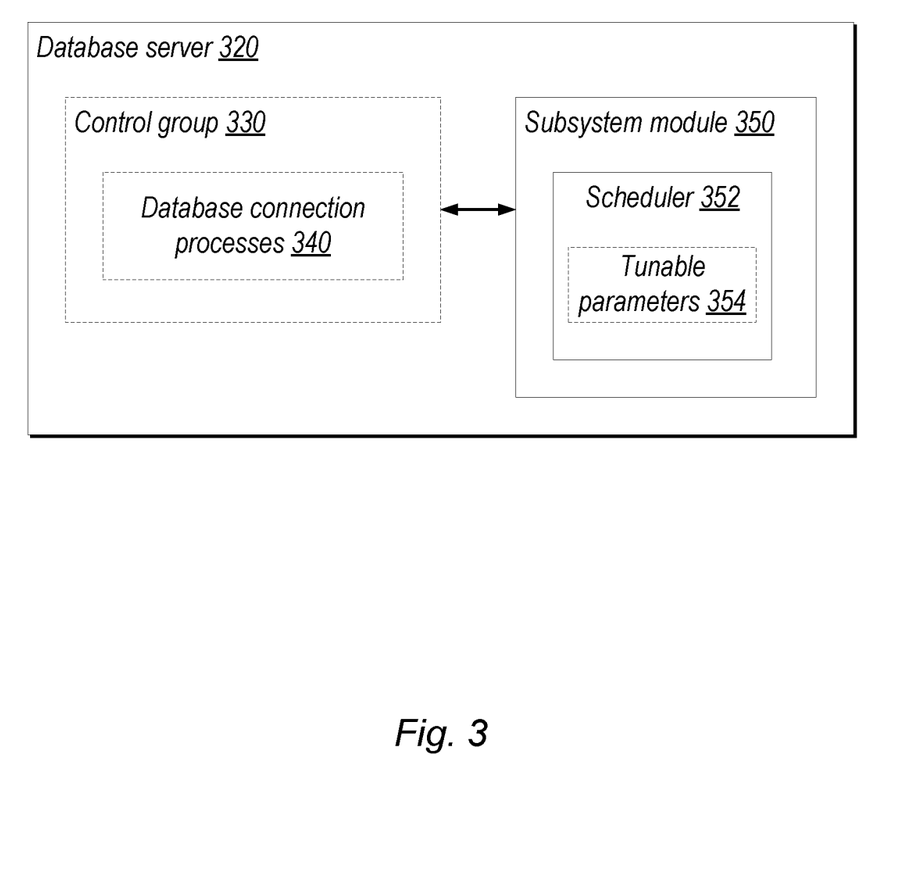
FIG. 3 is a block diagram illustrating an example database server that includes a subsystem module configured to assign execution resources to a control group, according to some embodiments.

FIG. 3 is a block diagram illustrating an example database server that implements a control group associated with a subsystem module that specifies types of parameters available to the control group for tuning, according to some embodiments. In the illustrated embodiment, database server 320 assigns one or more database connection processes 340 to handle one or more application requests and assigns the processes 340 to a control group (e.g., control group 330 in the illustrated example). In the illustrated embodiment, subsystem module 350 is associated with control group 330 and includes scheduler 352 and tunable parameters 354. The scheduler 352 and tunable parameters 354 may be used to schedule and enforce specific allocation of execution resources to control group 330.

Scheduler 352 may implement one or more of various different scheduling techniques. In the CPU context, for example, scheduler 352 may be a completely fair scheduler that divides CPU time proportional to the number of database connection processes assigned to a given control group. As another example, scheduler 352 may implement a real-time scheduler that limits the amount of CPU resources available to database connection processes for real-time requests, by allocating a run-time and period for the control group to which the process is assigned.

In some embodiments, a given subsystem module 350 may not include a scheduler and may be configured to control resource allocation for control groups 330 without using scheduler 352. For example, a "cpuset" subsystem assigns individual CPUs and memory nodes to one or more control groups to which it is associated. In this example, the cpuset subsystem may use the "cpuset.cpus" and "cpuset.mems" parameters (examples of tunable parameters 354) to specify a set of CPUs or memory nodes that a control group is allowed to use.

A given control group may be associated with multiple different subsystems 350. For example, a "cpu" subsystem (that controls CPU resources) and a "cpuset" subsystem (discussed above) may both control resource allocation for control group 330. In some embodiments, multiple different control groups 330 are arranged in a control group hierarchy that is associated with a single subsystem module 350 or multiple different subsystem modules.

Tunable parameters 354 are examples of resource allocation parameters, associated with a given subsystem, that may be assigned different values for one or more control groups associated with the subsystem and may be different for different control groups. Note that a subsystem may dictate a set of parameters that may be tuned for one or more control groups associated with the subsystem and different control groups may specify values for different subsets of the set of parameters. For example, a "cpu.shares" tunable parameter may specify a relative share of CPU time available to a control group. As another example, a "cpu.rt_period_us" tunable parameter may specify timing for reallocation of a control group's resources.

The following is a non-limiting list of example subsystems: block input/output, CPU scheduler, network, memory, and devices. Various subsystems may include various tunable parameters that may be used to configure resource usage among control groups. Note that, although Linux control groups and subsystems are discussed herein for purposes of explanation, this discussion is not intended to limit the scope of the present disclosure. Rather, the disclosed techniques may be used with various operating systems that allow control of execution resources for different groups of processes.

As used herein, the term "module" refers to circuitry configured to perform specified operations or to physical non-transitory computer readable media that store information (e.g., program instructions) that instructs other circuitry (e.g., a processor) to perform specified operations. Modules may be implemented in multiple ways, including as a hardwired circuit or as a memory having program instructions stored therein that are executable by one or more processors to perform the operations. A hardware circuit may include, for example, custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, or the like. A module may also be any suitable form of non-transitory computer readable media storing program instructions executable to perform specified operations.

Example Control Group Assignment Based on Tenant Information

Figure 4:
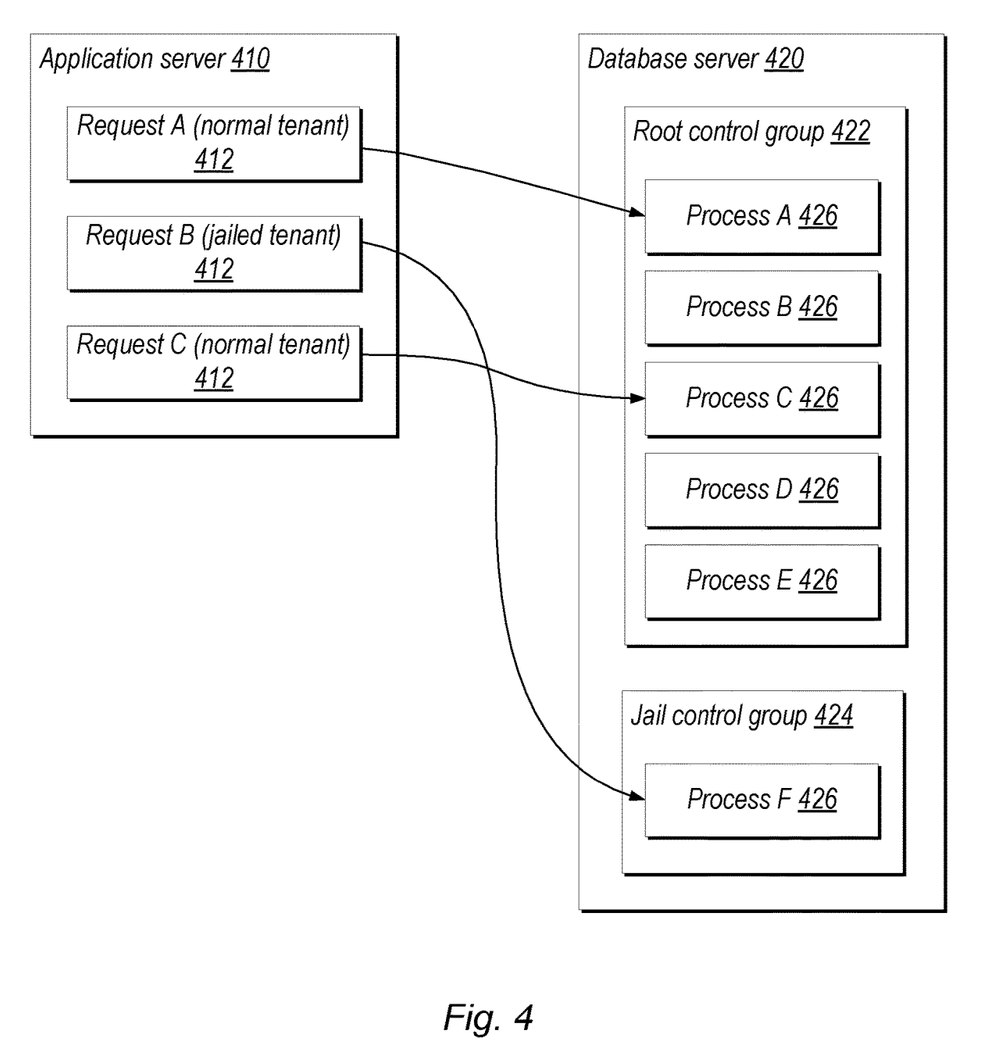
FIG. 4 is a block diagram illustrating example control groups for handling different types of tenants in a multi-tenant database, according to some embodiments.

FIG. 4 is a block diagram illustrating example root and jail control groups for different tenants, according to some embodiments. In the illustrated embodiment, application server 410 sends requests A-C 412 to database server 420 for different tenants. In the illustrated embodiment, a process for request B for a particular tenant is assigned to a jail control group 424 while other processes are assigned to a root control group 422. This may prevent negligent or malicious tenants from overloading the database server 420, in some embodiments.

Various different requests (for one or more types of tenants) may be sent from application server 410 to database server 420 where the database connection processes for these requests may be assigned to various different control groups.

Although foreground/background tasks and jailed tenants are discussed as specific examples in FIGS. 2 and 4, the disclosed techniques are in no way limited to these examples. In various embodiments, database server 420 is configured to determine a process group for a request 412 based on various application information such as user, tenant, application functionality, etc. or any combination thereof. Example tenant characteristics that may be considered when assigning requests of a tenant to a process group include, without limitation: number of submitted requests, amounts of resources utilized, patterns of accesses (e.g., indicating that an account of the tenant has likely been tampered with), etc.

As another specific example, database server 420 may identify that previous requests from a given tenant are using an inappropriate amount of resources, by utilizing information from the "cpuacct" subsystem. The cpuacct subsystem may automatically report the amount of CPU resources used by one or more database connection processes. Based on the information provided by the cpuacct subsystem, database server 420 may detect inappropriate behavior from a particular tenant and assign current or subsequent requests from that tenant to jail control group 424. In some embodiments, database server 420 may reassign active database connection processes (e.g., move them from one control group to another) based on information provided by one or more subsystems (e.g., cpuacct, cpuacct.stat, etc.). In some embodiments, limiting resources available to tenants that exhibit inappropriate behavior may advantageously improve security for a multi-tenant database system, e.g., by limiting the impact of distributed denial of service (DDoS) attacks.

In some embodiments, resource usage determined by the cpuacct subsystem is reported for particular tenants or application functionality, e.g., for use to predict production costs for adding functionality or additional tenants. For example, application information for a particular application function may be used in combination with cpuacct to predict the amount of resources necessary to implement the application functionality in a multi-tenant database before releasing the functionality in a multi-tenant production environment. As another example, resource usage reported for a particular tenant may be used to predict that the tenant will require a higher level of service relative to a current service level associated with the tenant, and the service level may be correspondingly updated for the tenant.

In some embodiments, the system may consider an external event associated with the tenant when assigning requests for that tenant (e.g., if a tenant is expected to submit a higher volume of requests than usual during a known time interval, those requests may be assigned to a particular control group based on this knowledge). In some embodiments, different levels of service are provided to different entities (e.g., customers or tenants), where requests from a given entity are assigned to one or more process groups based on their associated level of service. For example, requests received by a multi-tenant database system from a tenant with a high service level relative to other tenants may be assigned to one or more control groups with greater amounts of resources per process than other control groups.

In some embodiments, one or more machine learning engines are used to assign database connection processes for application requests to process groups. As one example, application server 410 or database server 420 may include one or more machine learning engines that predict information associated with subsequent requests based on application information for prior requests. In this example, the one or more machine learning engines may predict the volume or content of requests, as well as an amount of resources needed to process the predicted requests. In some embodiments, one or more machine learning engines predict information associated with requests from a given tenant.

Example Code for a Database Application Programming Interface

In some embodiments, an application server (e.g., application server 110) communicates with a database server (e.g., database server 120) using an application programming interface (API) implemented by the database server. Control code that uses this API may be executed by one or both of the application server and the database server. The database server API may specify the language (e.g., commands) that may be used by one or more applications to communicate with the database server. Non-limiting examples of code that uses such an API are shown below.

Table 1 shows example syntax for commands for creating, modifying, and dropping realms (e.g., process groups), as well as using realms to control tenants, features, users, etc.

TABLE 1

CREATE REALM <realm-name> TYPE <subsystem> WITH (tunable parameter list);
ALTER REALM <realm-name> SET (tunable parameter list);
DROP REALM <realm-name>;
ALTER SESSION <session-identifier> SET REALM TO <realm-name>;
ALTER TENANT <tenant-name> SET REALM TO <realm-name>;
ALTER TENANT <tenant-name> SET REALMS TO <realm-name> WITH (feature = <feature-identifier>);

TABLE 1-continued

ALTER TENANT <tenant-name> SET REALM TO <realm-name>
WITH (feature = <feature-identifier> and user =<user-name>);
ALTER FEATURE <feature-identifier> SET REALM TO <realm-name>;

In the example of Table 1, the CREATE REALM command is used to create a process group (e.g., a control group), wherein the realm-name indicates the name of the realm, the subsystem indicates the type of subsystem in control group implementations (e.g., compute, memory, network, device, audit, etc.) and the tunable parameter list provides values for tunable parameters for the specified subsystem (e.g., hard_limit, soft limit for the compute subsystem or "max_usage_in_bytes" or "swappiness" for the memory subsystem).

For example, the code "CREATE REALM 'sync' TYPE COMPUTE WITH (soft limit=40);" would set the maximum amount of CPU that can be used by backends in this realm to 40% under certain circumstances, but allow use of more than 40% when there is no CPU contention. As another example, the code "CREATE REALM 'async' TYPE COMPUTE WITH (hard_limit=20);" sets the maximum amount of CPU that can be used by backends in this realm to 20% as a hard limit that cannot be surpassed even if there is no contention on the system. As another example, the code "CREATE REALM 'swap_unlikely' TYPE MEMORY WITH (swappiness=30);" creates a realm 'swap_unlikely' where the memory in the address space owned by a process in this group is less likely to be swapped by the kernel compared to the default kernel settings. Similarly, there can be a group where the memory in the address space is more likely to be swapped out from the default setting in the kernel.

In the example of Table 1, the ALTER REALM command is used to adjust parameters for a realm. For example, the code "ALTER REALM 'async' SET (hard_limit=40);" may adjust an existing async realm to have a hard CPU limit of 40%. In the example of Table 1, the DROP REALM command is used to delete a realm.

In the example of Table 1, the ALTER SESSION command is used to adjust parameters for a particular database backend identified by the session-identifier. In some embodiments, execution (e.g., SQL executed) for this backend will then be governed by the parameters for the identified realm. For example, the code "ALTER SESSION SET REALM TO 'swap_unlikely';" would assign the current session to a swap_unlikely realm.

In the example of Table 1, the ATLER TENANT command is used to assign operations for a specified tenant to a specified realm. Table 1 shows three examples of this command. In the first, the entire tenant is assigned to the specified realm. In the second example, requests for the identified tenant associated with a particular feature as assigned to the specified realm. For example, the code "ALTER TENANT 'testing-tenant' SET REALM TO 'sync' FOR FEATURE 'new-reporting-tool';" assigns requests from testing-tenant for the new-reporting-tool feature to a sync realm. In the third example, requests from a specific user of the identified tenant associated with a particular feature are assigned to the specified realm. For example, the code "ALTER TENANT 'customer-with-big-sale' SET REALM TO 'service-tier-1' WITH (feature='commerce-cloudsales');" assigns requests from the customer-with-big-sale tenant for the commerce-cloudsales feature to a service-tier-1 realm (while requests for other features for that tenant may be in a default realm or some other realm).

In the example of Table 1, the ALTER FEATURE command is used to assign all requests associated with the identified feature to an identified realm. For example, the code "ALTER FEATURE 'brand-new-reporting-tool' SET REALM TO 'async';" results in all requests for the brand-new-reporting-tool feature to the async realm.

Note that the disclosed examples are not intended to limit the scope of the present disclosure, but that realms may be assigned at various granularities or combinations of tenants, users, features, etc. In some embodiments, if there are conflicting assignments of tenants/features/users to different realms, an arbitration module may appropriately assign requests to realms. For example, the arbitration module may assign a realm based on the most specific rule that covers a given request. Further, the disclosed API commands are included for purposes of explanation but are not intended to limit the scope of the present disclosure. Various API syntaxes may be used to implement disclosed functionality in various embodiments.

Example Method

Figure 5:
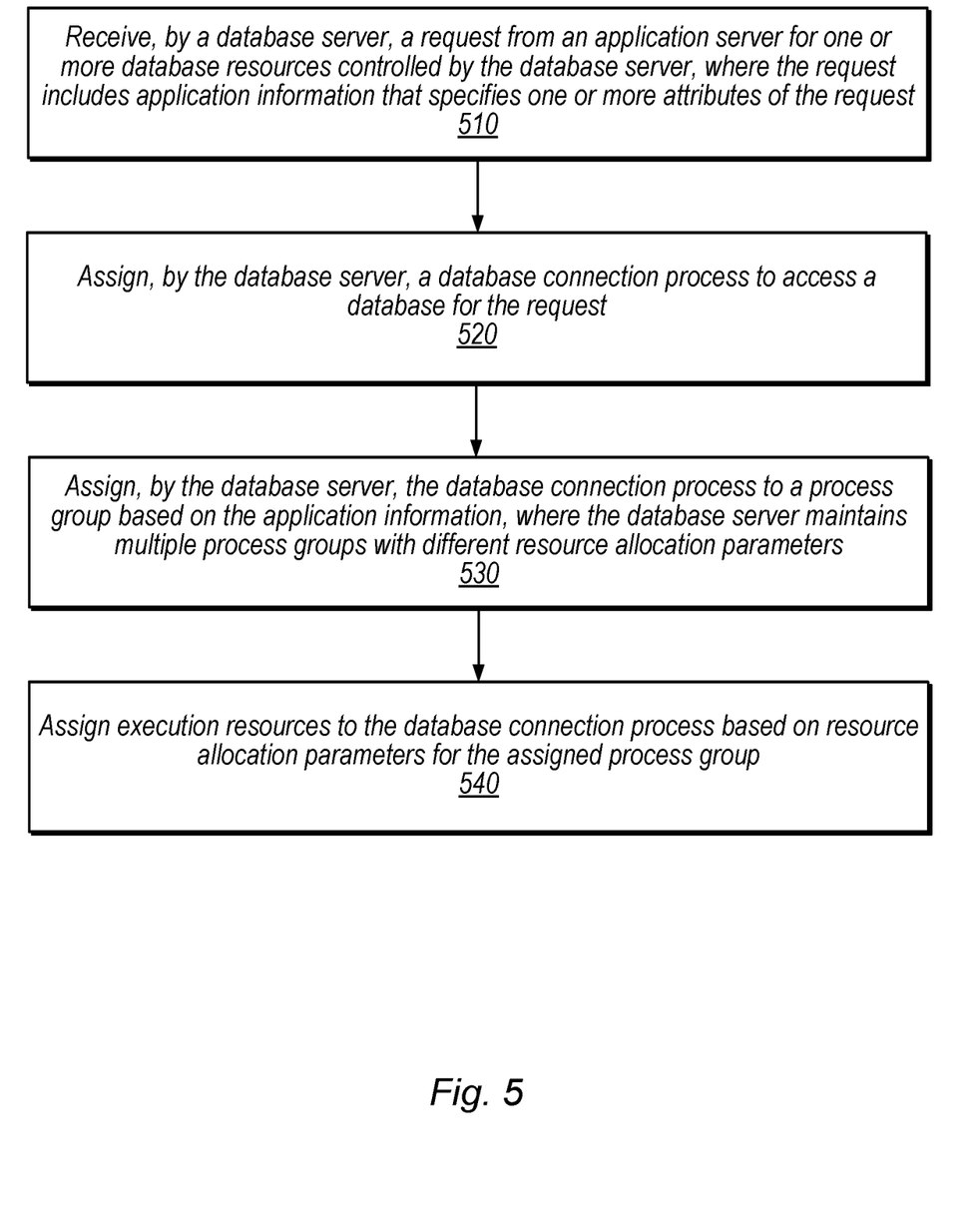
FIG. 5 is a flow diagram illustrating an example method for controlling allocation of execution resources using one or more process groups, according to some embodiments.

FIG. 5 is a block diagram illustrating an example method for controlling allocation of execution resources using one or more process groups, according to some embodiments. The method shown in FIG. 5 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired.

At 510, in the illustrated embodiment, a database server receives a request from an application server for one or more database resources controlled by the database server, where the request includes application information that specifies one or more attributes of the request. Examples of attributes include, without limitation: an identified application functionality associated with the request, a tenant associated with the request, a user initiating the request, a process group to which the request should be assigned, an application associated with the request, etc.

At 520, the database server assigns a database connection process to access a database for the request. In some embodiments, the database server sends information to the application server specifying one or more types of process groups that are maintained by the database server, and the application information specifies a type of process group to which the request should be assigned.

At 530, the database server assigns the database connection process to a process group based on the application information, where the database server maintains multiple process groups with different resource allocation parameters. In some embodiments, the database server assigns a first database connection process for a foreground task to a first process group and a second database connection process for a background task to a second process group.

In some embodiments, resource allocation parameters for the first process group specify a greater amount of a first type of execution resource per process than the resource allocation parameters for the second process group. For example, the first type of process group may process application requests from tenants exhibiting normal behavior, where this process group has a greater amount of CPU time per database connection process allocated than a jail process group (which may process requests from tenants whose previous requests were using inappropriate amounts of resources). As another example, different process groups may provide different service tiers associated with different payment plans for different tenants. Similarly, a higher-level service tier (and corresponding process group) may be temporarily used for requests for a tenant who is expected to have more traffic than normal, for a short duration. In some embodiments, the database server assigns database connection processes for requests from a first tenant to a first process group and database connection processes for requests from a second tenant to a second process group.

In some embodiments, the database server assigns the database connection process to a process group based on tenant information included in the application information. In some embodiments, the tenant information included in the application information indicates a tenant whose activity meets one or more thresholds. For example, the tenant has a history of submitting too many requests in a given time period.

At 540, the database server assigns execution resources to the database connection process based on resource allocation parameters for the assigned process group. In some embodiments, the process groups are Linux control groups and the assignment of execution resources to database connection processes is performed by one or more subsystem modules. Examples of subsystem modules include the following: block input/output, CPU scheduler, network, memory, and devices. In some embodiments, the resource allocation parameters include one or more tunable parameters of a subsystem module.

In some embodiments, the database server modifies resource allocation parameters for the process group to which the database connection process is assigned based on the application information included in the request. For example, one or more subsystem modules that are controlling resource allocation for a process group may be removed based on application information (e.g., a greater amount of resources may be allocated for the process group based on the application information indicating that a new application request may need a large amount of resources for processing). In some embodiments, the database server creates a process group for a received request and determines resource allocation parameters (e.g., one or more subsystem modules) for the created process group based on the application information included with the request.

In some embodiments, using control groups to allocate system resources for one or more database connection processes may advantageously improve database efficiency, which in turn may reduce costs associated with maintaining a database. In addition, disclosed techniques may reduce or avoid situations where database connection processes monopolize external resources for undesirable lengths of time. In some embodiments, limiting the number of database connections available to background tasks and/or jailed tasks may advantageously prevent the system from running out of connections for other more important tasks (e.g., foreground tasks).

Example Computing Device

Figure 6:
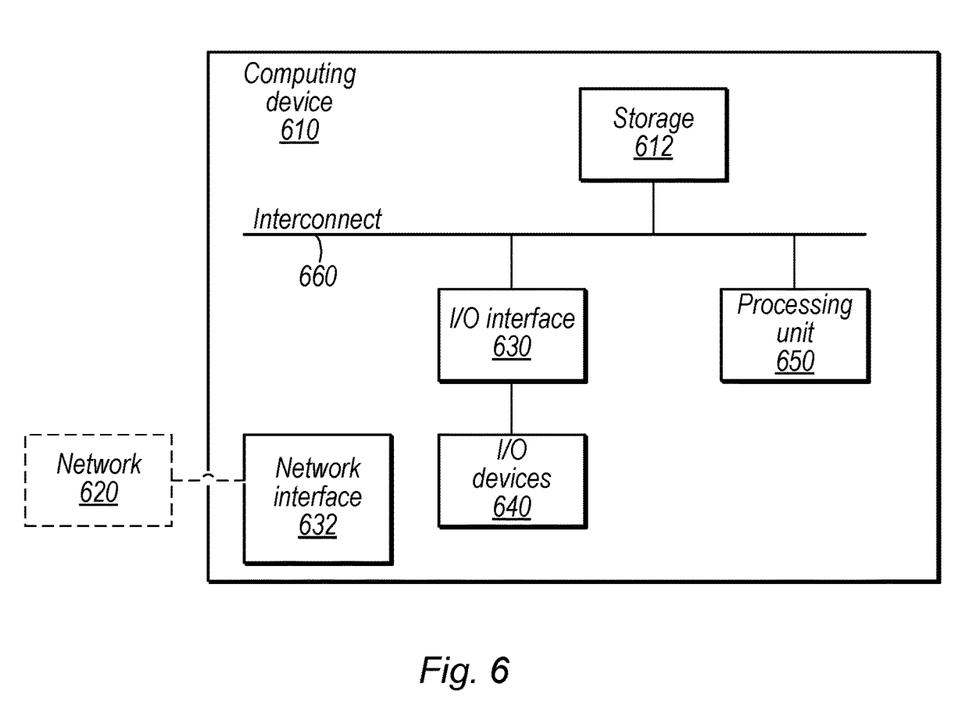
FIG. 6 is a block diagram illustrating an example computing device, according to some embodiments.

Turning now to FIG. 6, a block diagram of a computing device (which may also be referred to as a computing system) 610 is depicted, according to some embodiments. Computing device 610 may be used to implement various portions of this disclosure. Computing device 610 is one example of a device that may be used as a mobile device, a server computer system, a client computer system, or any other computing system implementing portions of this disclosure.

Computing device 610 may be any suitable type of device, including, but not limited to, a personal computer system, desktop computer, laptop or notebook computer, mobile phone, mainframe computer system, web server, workstation, or network computer. As shown, computing device 610 includes processing unit 650, storage subsystem 612, and input/output (I/O) interface 630 coupled via interconnect 660 (e.g., a system bus). I/O interface 630 may be coupled to one or more I/O devices 640. Computing device 2610 further includes network interface 632, which may be coupled to network 620 for communications with, for example, other computing devices.

Processing unit 650 includes one or more processors, and in some embodiments, includes one or more coprocessor units. In some embodiments, multiple instances of processing unit 650 may be coupled to interconnect 660. Processing unit 650 (or each processor within processing unit 650) may contain a cache or other form of on-board memory. In some embodiments, processing unit 650 may be implemented as a general-purpose processing unit, and in other embodiments it may be implemented as a special purpose processing unit (e.g., an ASIC). In general, computing device 610 is not limited to any particular type of processing unit or processor subsystem.

As used herein, the terms "processing unit" or "processing element" refer to circuitry configured to perform operations or to a memory having program instructions stored therein that are executable by one or more processors to perform operations. Accordingly, a processing unit may be implemented as a hardware circuit implemented in a variety of ways. The hardware circuit may include, for example, custom very-large-scale integration (VLSI) circuits or gate arrays, off-the-shelf semiconductors such as logic chips, transistors, or other discrete components. A processing unit may also be implemented in programmable hardware devices such as field programmable gate arrays, programmable array logic, programmable logic devices, or the like. A processing unit may also be configured to execute program instructions or computer instructions from any suitable form of non-transitory computer-readable media to perform specified operations.

Storage subsystem 612 is usable by processing unit 650 (e.g., to store instructions executable by and data used by processing unit 650). Storage subsystem 612 may be implemented by any suitable type of physical memory media, including hard disk storage, floppy disk storage, removable disk storage, flash memory, random access memory (RAM—SRAM, EDO RAM, SDRAM, DDR SDRAM, RDRAM, etc.), ROM (PROM, EEPROM, etc.), and so on. Storage subsystem 612 may consist solely of volatile memory in some embodiments. Storage subsystem 612 may store program instructions executable by computing device 610 using processing unit 650, including program instructions executable to cause computing device 610 to implement the various techniques disclosed herein.

I/O interface 630 may represent one or more interfaces and may be any of various types of interfaces configured to couple to and communicate with other devices, according to various embodiments. In some embodiments, I/O interface 630 is a bridge chip from a front-side to one or more back-side buses. I/O interface 630 may be coupled to one or more I/O devices 640 via one or more corresponding buses or other interfaces. Examples of I/O devices include storage devices (hard disk, optical drive, removable flash drive, storage array, SAN, or an associated controller), network interface devices, user interface devices or other devices (e.g., graphics, sound, etc.).

It is noted that the computing device of FIG. 6 is one embodiment for demonstrating disclosed concepts. In other embodiments, various aspects of the computing device may be different. For example, in some embodiments, additional components, or multiple instances of the illustrated components may be included.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
   receiving, by a database server, a request from an application server that specifies one or more database resources controlled by the database server, wherein the request includes application information that specifies one or more attributes of the request;
   assigning, by the database server, a database connection process to access a database for the request;
   assigning, by the database server, the database connection process to a process group based on the application information; and
   assigning execution resources to the database connection process based on resource allocation parameters for the assigned process group.

2. The method of claim 1, further comprising:
   assigning, by the database server, a first database connection process for a foreground task to a synchronous process group and a second database connection process for a background task to an asynchronous process group, wherein resource allocation parameters for the synchronous process group specify a greater amount of a first type of execution resource per process than resource allocation parameters for the asynchronous process group.

3. The method of claim 2, further comprising:
   storing information indicating resource usage over time for a particular type of request and modifying resource allocation parameters for one or more process groups based on the resource usage.

4. The method of claim 1, wherein the database server maintains multiple process groups with different resource allocation parameters, and wherein the database server receives requests associated with multiple tenants in a multi-tenant system.

5. The method of claim 4, further comprising:
   assigning, by the database server, a first database connection process for a tenant with a first service level agreement to a first process group and a second database connection process for a tenant with a second service level agreement to a second process group.

6. The method of claim 1, wherein the process group is a control group and wherein the assigning execution resources to the database connection process is performed by one or more subsystem modules, including one or more types of the following types of subsystem modules:
   block input/output, CPU scheduler, network, and memory.

7. The method of claim 1, further comprising:
   modifying resource allocation parameters for the process group to which the database connection process is assigned based on the application information included in the request.

8. The method of claim 7, further comprising:
   creating a process group for the received request; and
   determining resource allocation parameters for the created process group based on the application information included with the request.

9. The method of claim 7, further comprising:
   sending to the application server, by the database server, information that specifies one or more types of process groups that are maintained by the database server, wherein the application information specifies a type of process group to which the request should be assigned.

10. A non-transitory computer-readable medium having instructions stored thereon that are executable by a database server to perform operations comprising:
    receiving a request from an application server that specifies one or more database resources controlled by the database server, wherein the request includes application information that specifies one or more attributes of the request;
    assigning a database connection process to access a database for the request;
    assigning the database connection process to a process group based on application information; and
    assigning execution resources to the database connection process based on resource allocation parameters for the assigned process group.

11. The non-transitory computer-readable medium of claim 10, further comprising:
    assigning, by the database server, database connection processes for requests from a first tenant to an asynchronous process group and database connection processes for requests from a second tenant to a synchronous process group.

12. The non-transitory computer-readable medium of claim 11, wherein resource allocation parameters for the synchronous process group specify a greater amount of a first type of execution resources per process than resource allocation parameters for the asynchronous process group to reduce adverse effects of a denial-of-service attack associated with the first tenant.

13. The non-transitory computer-readable medium of claim 10, wherein the assigning the database connection process to a process group is based on tenant information included in the application information.

14. The non-transitory computer-readable medium of claim 13, wherein the assigning the database connection process is performed by one or more machine learning engines based on the application information.

15. The non-transitory computer-readable medium of claim 10, wherein the database server maintains multiple process groups with different resource allocation parameters, and wherein the operations further comprise:

modifying resource allocation parameters for the process group to which the database connection process is assigned based on the application information included in the request.

16. A method, comprising:

sending, by an application server to a database server, a request that specifies one or more database resources controlled by the database server, wherein the request includes application information that specifies one or more attributes of the request; and receiving, from the database server, a response to the request, wherein the response includes the one or more database resources, wherein the response is generated by the database server using a set of resources for a database connection process assigned to a process group based on the application information.

17. The method of claim 16, further comprising:

receiving, by the application server from the database server, information that specifies multiple types of process groups that are maintained by the database server; and wherein the application information indicates a type of process group for the request, from the multiple types of process groups, and wherein the database connection process is assigned to the process group based on the indication.

18. The method of claim 17, wherein the set of resources is assigned based on resource allocation parameters for a process group to which the database connection process is assigned based on the application information, wherein the request further includes an indication to create a process group for the request, and wherein the database server determines resource allocation parameters for the created process group based on the application information included with the request.

19. The method of claim 18, wherein the application information specifies one or more types of tasks associated with the request and wherein the process group to which the database connection process is assigned is based on the specification of the one or more types of tasks.

20. The method of claim 19, wherein the application information specifies tenant information and wherein the process group to which database connection process is assigned is selected based on the specified tenant information.

* * * * *